June 2, 1925.
W. A. TEBO
MEANS FOR MOUNTING A BUSHING OR THE LIKE IN AN OPENING
Filed April 30, 1924
1,540,435
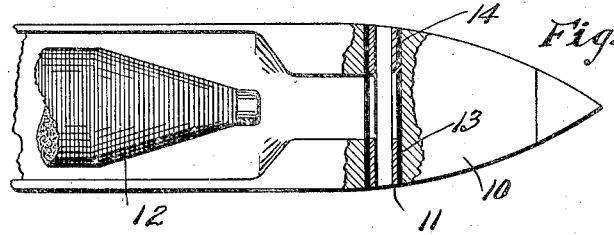
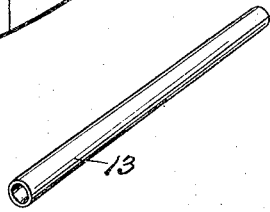
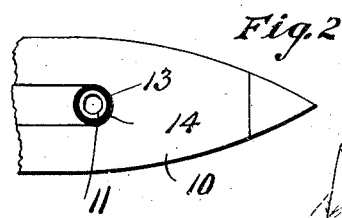
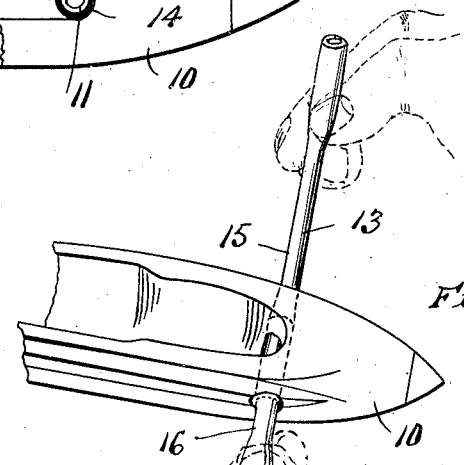
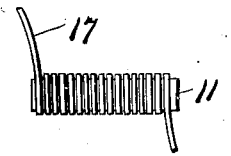
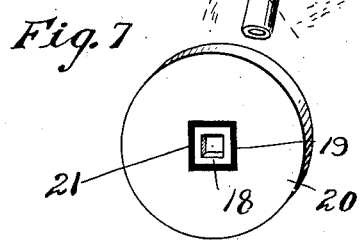
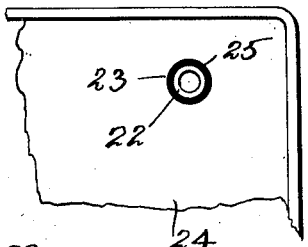
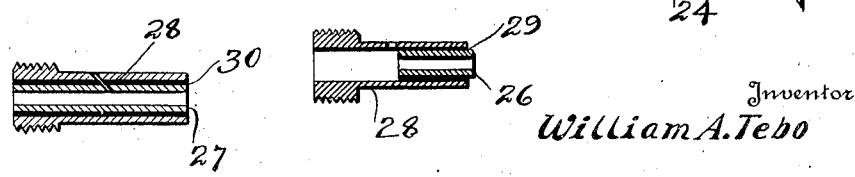
Inventor
William A. Tebo
By Barlow & Barlow
Attorneys Patented June 2, 1925.

1,540,435

UNITED STATES PATENT OFFICE.

WILLIAM A. TEBO, OF ANTHONY, RHODE ISLAND.

MEANS FOR MOUNTING A BUSHING OR THE LIKE IN AN OPENING.

Application filed April 30, 1924. Serial No. 710,098.

*To all whom it may concern:*

Be it known that I, WILLIAM A. TEBO, a citizen of the United States, residing at Anthony, in the county of Kent and State of Rhode Island, have invented certain new and useful Improvements in Means for Mounting a Bushing or the like in an Opening, of which the following is a specification.

This invention relates to an improved means for mounting and securing an article such as a bushing and the like, in an opening; and has for its object to apply an elastic member under tension to the outer surface of the article and insert the article with its tensioned elastic member into the opening or conversely to insert the elastic member in the opening, tension it, position the article therein and subsequently release the elastic member, permitting it to expand in the opening to grip the walls thereof and so bind the article therein.

With these and other objects in view, the invention consists of certain novel features of construction, as will be more fully described, and particularly pointed out in the appended claims.

In the accompanying drawings:—

Figure 1 is a plan view partly in section of a shuttle illustrating a guide eye in an opening of the shuttle and retained therein by a compressed elastic member located between the wall of the opening and that of the guide eye.

Figure 2 is a side elevation of the member illustrated in Figure 1.

Figure 3 illustrates a tubular guide eye.

Figure 4 is a perspective view illustrating a length of rubber tubing which is designed to inclose the guide eye and to be stretched lengthways to reduce the thickness of its walls during the insertion of the guide eye into its opening.

Figure 5 is a perspective view illustrating the inserted portion of the guide eye inclosed within the walls of the expanded elastic tube.

Figure 6 is a modification illustrating a strip of elastic material as wound about the outer surface of the guide eye prior to being inserted into the opening.

Figure 7 is a perspective view of a pulley illustrating its central bearing portion as being secured in position by means of the compressed elastic member.

Figure 8 illustrates a porcelain guide eye inserted into a metallic sleeve and held therein by means of a compressed elastic member.

Figure 9 is a similar view illustrating the porcelain guide eye as extending throughout the length of the metallic sleeve.

Figure 10 illustrates a bushing as inserted and retained in a glass wind-shield or the like by means of a compressed elastic sleeve located between the bushing and the glass.

It is found in practice difficult to drive or force articles formed of porcelain or other infractible material into an opening in a member formed of material such as steel and the like which does not yield sufficiently to prevent breakage of the infractible material when forced thereinto. On the other hand, the same situation is presented when it is desired to insert a steel bushing into an opening formed in infractible material such as glass and the like, and in order to prevent breakage of the infractible material, I have provided an elastic member to be inserted between the walls of the opening and the article to be inserted therein, whereby the infractible material, either of the article to be inserted or the receiving member having an opening therein, will not be broken by the positioning of this article therein; and the following is a detailed description of a structure embodying my present invention:—

With reference to the drawings, 10 designates a shuttle which may be formed of metal, fibre, wood or other suitable material, in which is inserted an eye member usually formed of porcelain or other suitable material through which yarn from a bobbin 12 is drawn.

It is found in practice that when this eye is formed of porcelain or other similar infractible material and the shuttle is formed of metal, or other similar relatively non-yielding material that the driving or forcing of an eye of such infractible material into the metal, causes the eye to crack and so destroys its utility.

In order to obviate this difficulty, I have found it of advantage to position a cushioning material between the infractible material and the steel, which I have accomplished in a very simple but practical way which is that of inserting the eye member into a length of rubber tubing 13 or other relatively elastic material and then pass this tubing through the opening 14 in the shuttle, which opening is of a size greater than the diameter of the eye-member but less than that of the eye-member plus the normal size of the elastic covering. Therefore, in order to reduce the diameter of this covering at the point where it covers the walls of the porcelain eye-member, I stretch the tubing in the direction of its length which reduces the thickness of its walls and permits the eye-member to be drawn into the opening in the shuttle and when so positioned the elastic tubing is released permitting its walls to thicken up and so securely grip and bind its eye-member against the walls of the opening after which the protruding ends such as 15 and 16 of the tube, as illustrated in Figure 5, are cut off and the eye-member is securely bound in its opening against inadvertent removal.

I do not wish to be restricted to the positioning of the eye-member in a rubber tube in order to provide an inclosing sheath for the same before inserting it into the opening as, in some instances, an elastic strip 17 such as illustrated in Figure 6, may be wound tightly in a compressed position about the eye-member and subsequently positioned in the opening in the shuttle and then upon releasing the tensioned ends of the strip the same will expand about the porcelain and securely lock the eye against the walls of the opening. Neither do I wish to be restricted to the inserting of an eye in an opening in a shuttle by the means described as any desired article may be provided with a layer of elastic material and retained in an opening by compressing the elastic material between the walls of the opening and those of the article inserted. For instance, as is illustrated in Figure 7 wherein I provide a bushing member 18 which is secured in the central opening 19 of the pulley 20 by means of compressed elastic material 21 which is located between the outer walls of the bushing and the inner walls of the opening in which it is mounted.

In some instances, I may secure a bushing 22 in an opening 23 in a glass windshield 24 by means of an encircling rubber or elastic member 25 held under compression between the walls of the opening 23 and the outer surface of the bushing.

Also in Figures 8 and 9, I have illustrated porcelain eye members 26 and 27 which are inserted and held in position, each within a metal sleeve 28 by means of compressed inclosing rubber sheaths 29 and 30 located between the inner surface of the sleeve and outer surface of the porcelain, which metal sleeves are adapted to be positioned in the eye of a shuttle for guiding the yarn as drawn therefrom.

By my improved method of mounting and securing an article in an opening wherein the article having an opening or the article inserted therein, is formed of an infractible material wherein one or the other is likely to become injured by the forcing of the two together, it is found that by the positioning of a flexible or yieldable material between the two a somewhat flexible mounting is provided and fracture is prevented.

Having thus described one illustrative embodiment of my invention and the best mode known to me for carrying out my method, I desire it to be understood that although specific terms are employed, they are used in a generic and descriptive sense and not for the purpose of limitation, the scope of the invention being defined and limited only by the terms of the appended claims.

I claim:

1. The method of securing an article within an opening, which consists, in placing the article within the opening with an elastic material under longitudinal tension, from opposite directions and lying between the article and the walls of the opening and then releasing the tension.

2. A method of securing an article in an opening, which consists in applying an elastic member under tension to the outer surface of the article, inserting the article and subsequently releasing the elastic member to expand and so bind the article therein.

3. A method of securing an article in an opening, which consists in applying an elastic covering under tension over the article to grip the article, inserting the covered article into the opening, and subsequently releasing the covering to expand to grip both the walls of the opening and the article to bind the article therein.

4. A method of inserting and securing in a shuttle an eye member having an elastic covering, which consists in providing in the shuttle an opening of a size greater than that of the eye-member, and less than that of the eye-member plus the normal size of the covering, tensioning the covering to reduce its covering thickness, inserting the eye and its tensioned covering and subsequently releasing the covering to expand and grip the walls of the opening and bind the eye therein.

5. The method of securing an eye in a shuttle having an opening therein, which consists in positioning the eye within the opening with an expansible member interposed between the eye and the walls of the opening, while under longitudinal tension and then releasing the tension.

6. The method of securing an article within an opening, which consists in placing the article within an elastic tube, placing the tube under longitudinal tension, positioning the tube, with the article therein, in the opening and then releasing the tension.

In testimony whereof I affix my signature.

WILLIAM A. TEBO.